Figure 1:
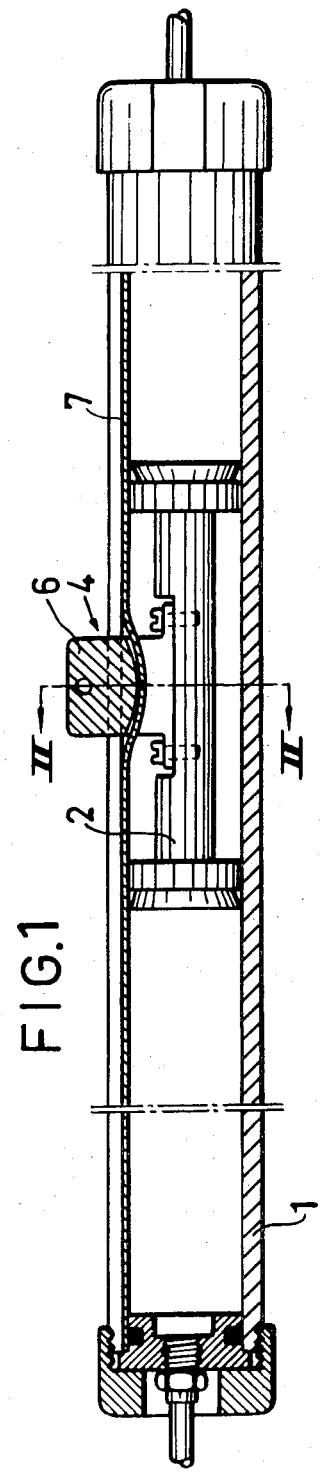

United States Patent [19]
Granbom et al.

[11] 3,820,446
[45] June 28, 1974

[54] MEANS AT PRESSURE FLUID CYLINDERS

[75] Inventors: Bo Granbom, Kungsor; Karl Gunnar Lundqvist, Ektorp, both of Sweden

[73] Assignee: Origa Cylindrar AB, Kungsor, Sweden

[22] Filed: Dec. 20, 1971

[21] Appl. No.: 209,823

[30] Foreign Application Priority Data
Dec. 22, 1970 Sweden.......................... 17400/70

[52] U.S. Cl............................ 92/88, 92/138, 277/80
[51] Int. Cl. .......................... F01b 9/00, F01b 29/00
[58] Field of Search ............ 91/399; 277/80; 92/88, 92/138; 244/63

[56] References Cited
UNITED STATES PATENTS
2,502,487  4/1950  Schell .................................. 91/399
3,283,865  11/1966  Mason ................................ 277/80
3,700,248  10/1972  Teske................................... 277/80

*Primary Examiner*—Paul E. Maslousky

[57] ABSTRACT

A pressure fluid cylinder having a slot extending longitudinally along the wall thereof and a piston provided with a projection extending through said slot and slidable with said piston. The slot being sealed by a sealing member along and attracted to the inside of said cylinder to seal the slot beyond the ends of the piston, said piston being interconnected to the sealing member so as to draw the member away from the slot between the ends of the piston as the piston is moved in the cylinder.

1 Claim, 5 Drawing Figures

MEANS AT PRESSURE FLUID CYLINDERS

This invention relates to a means at pressure fluid cylinders of the kind comprising a piston, which is adapted to be moved in a cylinder by fluid pressure and provided with a transmitting member taken along by the piston movement, said transmitting member projecting cut through and adapted to move along a slot in the cylinder wall, a sealing member provided at the inner surface of the cylinder being adapted to sealingly close said slot on both sides of the piston and be moved between the piston and the transmitting member to render possible the projecting of the transmitting member through said slot. Pressure fluid cylinders of the aforesaid kind have the advantage that the cylinder length only insignificantly exceeds the stroke length. One problem at such cylinders, however, is how to bring about an effective sealing of the cylinder slot passed through by the transmitting member.

Of the attempts made to bring about such sealing, the simplest way was by means of a sealing strip stretched within the cylinder between the cylinder ends and covering the slot. During operation the sealing strip is held pressed against the slot and seals the same by means of the pressure prevailing in the cylinder. A sealing of this kind, however, does not operate satisfactorily, because the sealing strip tends to move away from the slot, particularly at ceasing pressure in the cylinder.

An improved sealing is effected according to the Swedish patent specification No. 326,376, which relates to a means of the kind described above, in which means a sealing member extends past the slot and terminates in a longitudinal edge spaced from the slot, which edge is bent down away from the slot when the transmitting member passes, because a portion of the transmitting member is moved below the slot. Such a means provides an effective sealing, but it renders the design and mounting of the sealing member more complicated.

The present invention has as its object to improve means of the kind described above in the introductory portion. This object is achieved by the means according to the invention, which is characterized in that the sealing member is of a material having magnetic or permanent magnetic properties, and that adjacent the slot elements are provided which consist of permanent magnets or electromagnets or, alternatively, the elements and/or the cylinder wall are of a material with magnetic properties and the sealing member is of a permanent magnetic material, such that in both cases the sealing member at both ends of the piston in the longitudinal direction of the cylinder is attracted to the cylinder wall adjacent the slot by magnetic coaction between the sealing member and the elements.

The invention is described in greater detail in the following with reference to the accompanying drawings.

Figure 2:
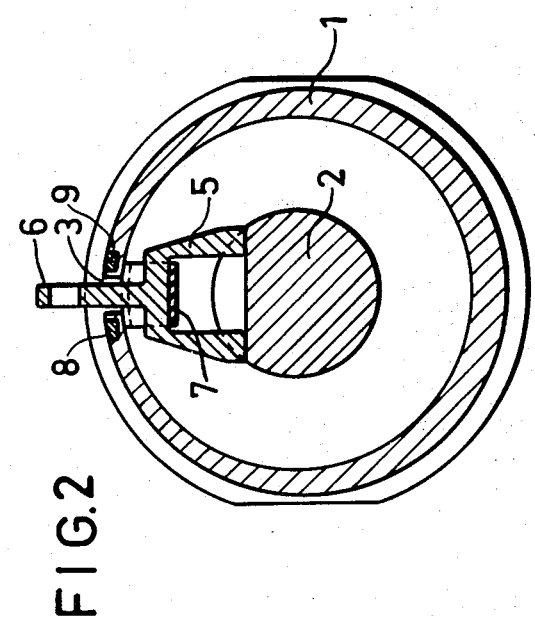
Figure 3:
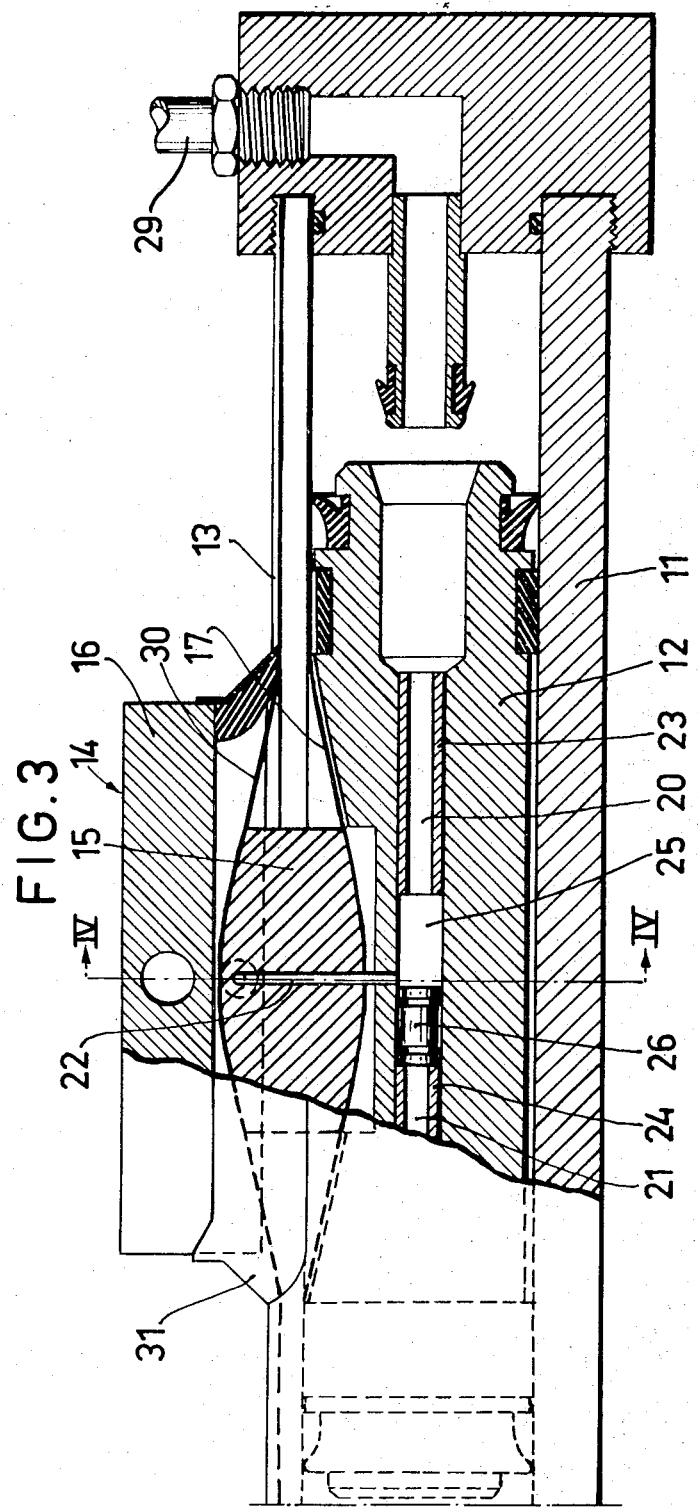
Figure 4:
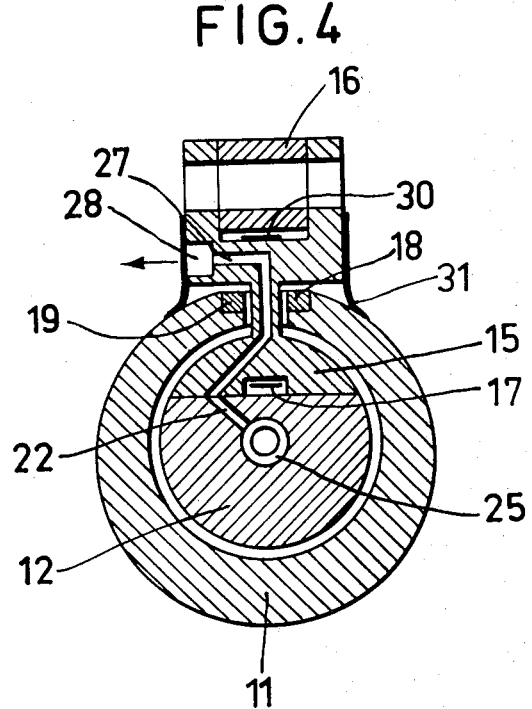
Figure 5:
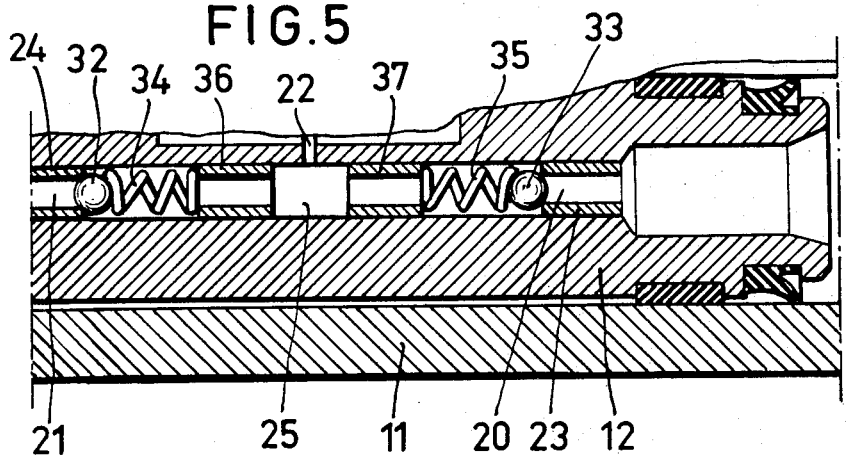

FIG. 1 shows substantially a longitudinal section through a pressure fluid cylinder according to the invention, FIG. 2 shows a section along the line II—II in FIG. 1, FIG. 3 shows a longitudinal section through a modified embodiment of the invention, FIG. 4 shows a section along the line IV—IV in FIG. 3, FIG. 5 shows a detail section of still another embodiment.

As appears from FIG. 1, a cylinder 1 includes a piston 2 adapted to be moved by a pressure fluid, such as air or oil. The cylinder further is provided with means (not designated) for the cylinder operation, such as an end cover, sealings and connecting fittings for the pressure fluid circulation. In the cylinder wall there is provided a longitudinal slot 3 (FIG. 2), out of which projects a transmitting member 4, which in the embodiment shown comprises a bow-shaped portion 5, which is secured on the piston, and a mounting plate 6, said member 4 having the object of transmitting the piston movement to the element desired to be actuated by means of the cylinder. The wall of the cylinder 1 has a somewhat greater thickness at the lower edge to increase the strength of the cylinder.

The cylinder 1 though being shown here to be of circular shape may have any suitable desired cross-sectional shape, and the transmitting member 4 may be designed in a different way within the scope of the invention, for example such as shown in the aforementioned Swedish patent specification 326,376. This applies also to the sealing member 7, which is described in greater detail below.

For sealing the slot at both ends of the piston 2 seen in the longitudinal direction of the cylinder, a sealing member is provided which has the form of a thin tape-shaped strip 7. Said sealing member 7 is moved below the bow-shaped portion 5 of the transmitting member 4 so as to render possible the plate-shaped portion 6 to project through the slot 3. The lower surface of the bow-shaped portion 5 constitutes a sliding surface for the sealing member 7, which on both sides of the transmitting member again is directed upwards to and abuts the inner surface of the cylinder 1 and covers the slot 3, both because the sealing member is pressed out by the piston against the cylinder surface and because the sealing member is retained by magnetic force, as will be described in greater detail lateron. The transmitting member 4, of course, may be designed in another way. When the sealing member 7 is a tape, which is open only on one side of the slot and at the other side is secured permanently on the inner surface of the cylinder, or when the sealing member 7 is a lining extending all around, as shown in the aforementioned patent specification, the bow-shaped portion 7 has only one leg and is open at that side where the sealing member 7 cannot be bent down. Such an embodiment of the transmitting member 4 is also shown in said patent specification.

The retaining and sealing of the sealing member or lining 7 against the slot at the inner surface of the cylinder is effected according to the invention by magnetic force. At one embodiment, elements 8, 9, which are permanent magnets or electromagnets, are provided at the slot, and the sealing member 7 consists of a material with magnetic properties, so that said sealing member 7 is attracted by the magnets to close the slot. The cylinder in this case preferably is made of a material with no magnetic properties, for example aluminum, glass-fibre-reinforced plastic or the like.

One can imagine also an embodiment, at which the sealing member 7 is of a permanent-magnetic material. At such an embodiment the cylinder may be made of a material with magnetic properties or, alternatively, elements 8, 9 having such properties may be provided at the slot. Also in this case the elements 8, 9 may be permanent magnets or electromagnets whereby the magnetic force field is intensified and a greater attraction force is obtained.

The elements 8, 9 preferably comprise several magnets arranged in the longitudinal direction of the cylinder 1 or bars with magnetic properties as described above. So-called magnet strips, of course, can also be imagined. When the sealing member 7 is open to the interior of the cylinder 1 only at one side of the slot, the elements 8, 9, of course, need be provided only on this side. At the embodiment shown, the elements 8, 9 are sunk into the outer surface of the cylinder on both sides of the slot, but they may, of course, also be provided, if desired, outside of the cylinder or at its inner surface. The elements may also be disposed in any arbitrary arrangement in the longitudinal direction such that two elements 8, 9 not necessarily must be located directly in front of each other, but the elements instead may be located alternatingly on both sides of the slot.

The inner surface of the cylinder adjacent the slot 3 and/or the sealing member 7 may be provided with auxiliary means improving the sealing, such as packings, strands of material with good sealing properties, for example rubber-like material, etc.

At the modified embodiment of the pressure fluid cylinder according to FIG. 3, a section through the cylinder 11 and its piston 12 at one end of the cylinder 11 is shown. The cylinder, as at the embodiment shown in FIGS. 1 and 2, is provided with a slot 13 and projecting out therethrough a transmitting member 14, which comprises a bow-shaped portion 15 and a mounting plate 16. A sealing strip 17 extends below the bow-shaped portion 15 and at both ends of the piston 12 up towards the slot 13, at which it is retained by means of magnet elements 18, 19 as described above.

At the embodiment shown in FIGS. 3 and 4, the piston is provided with a passageway 20 and, respectively, 21 extending in the longitudinal direction of the piston from the piston end and communicating with a passageway extending perpendicularly thereto, which passageway 22 opens into the upper portion of the transmitting member 14. Said passageway 22, as shown in FIG. 4, forms a bend when it passes the cavity of the bow-shaped portion 15, in which cavity the sealing strip 17 runs. In the longitudinally extending passageways 20, 21 are mounted two cylindric linings 23 and, respectively, 24 such that a widened portion or chamber 25 is formed, in which the passageways meet each other and the passageway 22. Within said chamber 25 is provided a freely running piston 26 sealed against the chamber wall, a so-called shuttle-valve, which acts as a valve means to shut the passageway not being under pressure, such as the passageway 21. The means shown is intended to supply a unit secured on the transmitting member 14 with a drive fluid for driving said unit. The passageway 22, thus, opens with a bent-off portion 27 into an outlet 28, to which can be connected a hose or the like from the unit for taking out drive fluid from the cylinder as indicated by the arrow in FIG. 4. At this embodiment, thus, a machining unit mounted on the transmitting member 14 can be moved by the piston 12 to a predetermined place and thereafter carry out the desired machining operation by means of the drive fluid supplied from the outlet 28. This operation can be repeated at several places along the length of the cylinder 11. When the piston is being moved in the other direction, the drive fluid is supplied from the opposed passageway 20 or 21, and the piston end not being under pressure is closed by the valve 26, which is pressed over to the opposed side of the chamber 25. If air is to be supplied only when the piston 12 moves in one direction, of course, one of the passageways 20 and, respectively, 21 as well as the valve 26 can be abolished.

The embodiment shown may also be modified in such a way, that the passageways 20 and, respectively, 21 are directed separately up to the transmitting member, and that the valve arrangement is disposed on the outside of the cylinder, for example on the transmitting member 14. The necessary adjustment, depending on which end of the piston 12 is under pressure, thereby preferably is made by separate valves (not shown), which are actuated by adjusting means in response to the piston movement.

FIGS. 3 and 4 further show a connection 29 at the cylinder end for the supply of drive fluid to the interior of the cylinder. There is further provided an external sealing strip over the slot 13 of the cylinder which passes an opening in the plate-shaped portion 16 of the transmitting member and is pressed down against the slot of a sealing collar 31 on the transmitting member 14.

At the embodiment in FIG. 5 showing a partial section through the piston 12, the shuttle valve 26 is replaced by two stop valves 32 and 33 disposed in the passageways 20 and 21 of the piston. The inner end of the linings 23 and, respectively, 24 hereby constitutes a seat for the valve balls 32, 33, which are held pressed against the seat by springs 34, 35, which in their turn are held in position by two inner sleeves or linings 36, 37. The passageway 22 thereby is fed always with compressed air from the passageway having the highest pressure. When, for example, the passageway 20 has the highest pressure, the valve 33 is open and the valve 32 is closed, and vice versa.

The embodiments shown are only examples of the application of the invention. The invention is not restricted to these embodiments, but also other embodiments can be imagined. The cylinder 1, as mentioned, may have a cross-sectional shape other than shown and may also be curved, in which case the piston preferably is hinged.

What we claim is:

1. A cylinder and piston construction comprising a cylinder of non-magnetic material having a slot extending longitudinally along the wall thereof, a piston provided with a guide channel therethrough, slidably mounted within said cylinder, a projection element attached to and movable with said piston and extending through the slot of said cylinder, a flexible strip sealing member having magnetic properties attached at its respective ends to said cylinder and extending longitudinally of the slot along the inside wall of said cylinder and in overlapping relation with the border portions of the slot for closing the slot on both sides of said projection and extending through the guide channel in said piston, and at least one magnet element disposed in the wall of said cylinder adjacent at least one side of the slot for attracting said sealing strip member against the slot, whereby the guide channel in said piston, as said piston moves in said cylinder, will withdraw said sealing strip from the slot to permit said projection to move therealong and will return said sealing strip member to said slot to close said slot, substantially all of those portions of said sealing strip lying on both sides of the guide channel being uniformly and sealingly attracted along their lengths by said at least one magnet element in the wall of said cylinder.

* * * * *